(12) United States Patent
Nomura et al.

(10) Patent No.: US 11,309,124 B2
(45) Date of Patent: Apr. 19, 2022

(54) METHOD FOR PRODUCING ELECTRONIC COMPONENT

(71) Applicant: Murata Manufacturing Co., Ltd., Kyoto-fu (JP)

(72) Inventors: Yoshiyuki Nomura, Nagaokakyo (JP); Shoichiro Furukawa, Nagaokakyo (JP); Mitsunori Inoue, Nagaokakyo (JP); Mikiko Noguchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 642 days.

(21) Appl. No.: 16/213,922

(22) Filed: Dec. 7, 2018

(65) Prior Publication Data

US 2019/0115148 A1 Apr. 18, 2019

Related U.S. Application Data (63) Continuation of application No. PCT/JP2017/022005, filed on Jun. 14, 2017.

(30) Foreign Application Priority Data

Jun. 16, 2016 (JP) .............................. JP2016-120200

(51) Int. Cl.
*H01F 27/32* (2006.01)
*H01G 4/224* (2006.01)
*H01G 4/12* (2006.01)
*H01G 4/30* (2006.01)
*H01F 27/02* (2006.01)
(Continued)

(52) U.S. Cl.
CPC ....... *H01F 27/327* (2013.01); *H01F 17/0013* (2013.01); *H01F 27/022* (2013.01); *H01F 27/2804* (2013.01); *H01F 27/292* (2013.01); *H01F 41/043* (2013.01); *H01F 41/046* (2013.01); *H01G 4/12* (2013.01); *H01G 4/224* (2013.01); *H01G 4/232* (2013.01); *H01G 4/30* (2013.01); *H01F 2017/048* (2013.01); *H01F 2027/2809* (2013.01)

(58) Field of Classification Search
CPC ...... H01G 4/224; H01F 27/327; H05K 1/185; H05K 3/284; H05K 2203/1305
See application file for complete search history.

(56) References Cited

U.S. PATENT DOCUMENTS

2016/0027569 A1* 1/2016 Inoue ...................... H01F 17/04
336/192

FOREIGN PATENT DOCUMENTS

| CN | 101354935 A | 1/2009 |
|----|-------------|--------|
| CN | 105304325 A | 2/2016 |

(Continued)

OTHER PUBLICATIONS

Document#1 : Silicon Emulsion, Shin Etsu. https://www.shinetsusilicone-global.com/catalog/pdf/emulsions_e.pdf(Year: 2009).*

(Continued)

*Primary Examiner* — Tabassom Tadayyon Eslami
(74) *Attorney, Agent, or Firm* — Studebaker & Brackett PC (57) ABSTRACT

A method for producing an electronic component includes a step of preparing a porous base body containing a ceramic and including an inner conductor disposed in the body; and a step of impregnating the base body with a resin emulsion.

12 Claims, 5 Drawing Sheets

(51) Int. Cl.
  *H01G 4/232* (2006.01)
  *H01F 17/00* (2006.01)
  *H01F 41/04* (2006.01)
  *H01F 27/28* (2006.01)
  *H01F 27/29* (2006.01)
  *H01F 17/04* (2006.01)

(56) References Cited

FOREIGN PATENT DOCUMENTS

| JP | H10-214741 A | 8/1998 |
| JP | 2001-110670 A | 4/2001 |
| JP | 2009-049360 A | 3/2009 |
| JP | 2009-049361 A | 3/2009 |
| JP | 2016-031991 A | 3/2016 |

OTHER PUBLICATIONS

An Office Action issued by the State Intellectual Property Office of the People's Republic of China dated Mar. 17, 2020, which corresponds to Chinese Patent Application No. 201780037308.5 and is related to U.S. Appl. No. 16/213,922. with English language translation.

An Office Action issued by the China National Intellectual Property Administration dated Nov. 10, 2020, which corresponds to Chinese Patent Application No. 201780037308.5 and is related to U.S. Appl. No. 16/213,922 with English language translation.

An Office Action; "Decision of Refusal," mailed by the Japanese Patent Office dated Oct. 1, 2019, which corresponds to Japanese Patent Application No. 2018-523975 and is related to U.S. Appl. No. 16/213,922; with English language translation.

International Search Report issued in PCT/JP2017/022005; dated Sep. 5, 2017.

International Preliminary Report on Patentability and Written Opinion issued in PCT/JP2017/022005; dated Dec. 18, 2018.

"Silicone Emulsions"; Shin-Etsu Chemical Co., Ltd.; Mar. 2014; p. 2, left column.

* cited by examiner

OUTERMOST SURFACE

METHOD FOR PRODUCING ELECTRONIC COMPONENT

CROSS-REFERENCE TO RELATED APPLICATIONS

This application claims benefit of priority to International Patent Application No. PCT/JP2017/022005, filed Jun. 14, 2017, and to Japanese Patent Application No. 2016-120200, filed Jun. 16, 2016, the entire contents of each are incorporated herein by reference.

BACKGROUND

Technical Field

The present disclosure relates to a method for producing an electronic component.

Background Art

In the process for producing an electronic component, such as an inductor, a thermistor, or a capacitor, that includes a ceramic base body, an inner conductor disposed in the ceramic base body, and an outer electrode electrically connected to the inner conductor, the outer electrode is formed by plating in some cases. In general, a ceramic base body has multiple pores, and thus a plating electrolyte may penetrate into the inner portion of the base body during formation of the outer electrode by plating. Accordingly, there is a possibility that the electrical characteristics of the electronic component will be degraded. In order to suppress degradation of the electrical characteristics, an electronic component in which pores in a ceramic base body are filled with a resin has been proposed.

Japanese Unexamined Patent Application Publication No. 2009-049361 describes a multilayer electronic component that includes a porous base body mainly composed of a ceramic and having a plurality of pores; a multilayer body disposed in the porous base body and having at least one inner electrode; an outer electrode connected to the inner electrode; and a terminal electrode formed on the outer electrode by plating, in which the porous base body has the pores filled with a resin at a filling ratio of 60% or more. Examples of the resin filling method described include a method involving immersing a porous base body in a liquid-state uncured resin so as to impregnate the pores in the porous base body with the resin, and a method involving pressure-injecting an uncured resin from an exposed surface of the porous base body.

Japanese Unexamined Patent Application Publication No. 2009-049360 describes a multilayer electronic component that includes a porous base body mainly composed of a ceramic and having a plurality of pores; a multilayer body disposed in the porous base body and having at least one inner electrode; an outer electrode connected to the inner electrode; and a terminal electrode formed on the outer electrode by plating, in which at least some of the pores in the porous base body are filled with an addition-polymerization-type resin. Examples of the resin filling method described include a method involving immersing the entire porous base body in a prepolymer solution for obtaining an addition-polymerization-type resin to impregnate the pores in the porous base body with the prepolymer and then performing polymerization and curing under heating, and a method involving pressure-injecting a prepolymer solution from an exposed surface of the porous base body and then performing polymerization and curing under heating.

Japanese Unexamined Patent Application Publication No. 10-214741 describes an electronic component that includes a ceramic base body, and a conductor disposed in the ceramic base body and/or a conductor disposed in an outer peripheral portion of the ceramic base body, in which pores in surfaces of the ceramic base body are impregnated with a particular organic silicon compound. In the method described in Japanese Unexamined Patent Application Publication No. 10-214741, impregnation is performed by immersing the electronic component in a solution containing the particular organic silicon compound (for example, a solution prepared by mixing a dehydration-condensation-type organic silicon compound with an organic solvent that serves as a diluent) and then performing a heat treatment.

SUMMARY

All of the methods described in Patent Documents 1 to 3 Japanese Unexamined Patent Application Publication Nos. 2009-049361, 2009-049360 and 10-214741 involve impregnating an electronic component with a homogenous liquid, such as a liquid resin or a solution prepared by diluting a resin with a solvent. Due to this method, the surfaces and the inner portion of the base body can be highly densely filled with the resin, and penetration of a plating solution or the like is suppressed.

However, the pores may be connected from a surface of a base body to the inner portion of the base body, for example, to a vicinity of the inner conductor. In such a case, the resin fills not only the pores that exist near the surfaces of the base body but also the pores that exist between the inner conductors, such as inner electrodes. The electrical characteristics of the base body near the inner conductors significantly affect electrical characteristics of the electronic component; and the inventors of the present disclosure have found an issue, which is a possibility of degradation of electrical characteristics of an electronic component when the pores that exist in the inner portion of the base body, for example, a vicinity of the inner conductors, are filled with a resin.

The present disclosure provides a method for producing an electronic component, with which degradation of electrical characteristics is suppressed while suppressing penetration of the plating solution into the inner portion of the base body. The inventors of the present disclosure have found that the pores that exist near the surfaces of the base body can be filled with a resin while suppressing penetration of the plating solution into the inner portion of the base body when, instead of a homogeneous liquid such as a liquid resin or a solution prepared by diluting a resin with a solvent, an heterogeneous resin emulsion is used to impregnate the electronic component, and thus made the present disclosure.

According to a first aspect of the present disclosure, there is provided a method for producing an electronic component, the method including a step of preparing a porous base body containing a ceramic and including an inner conductor disposed inside the base body; and a step of impregnating the base body with an emulsion of a resin.

According to a second aspect of the present disclosure, there is provided an electronic component including a porous base body containing a ceramic, and an inner conductor disposed inside the base body, the base body being filled with a resin, in which an amount of the resin in an inner portion of the base body is small compared to an amount of the resin in an outer peripheral portion of the base body.

Since the method for producing an electronic component according to the present disclosure has the above-described features, penetration of a plating solution into the inner portion of the base body is suppressed, while suppressing the resin to fill the inner portion of the base body. Thus, an electronic component with which degradation of electrical characteristics is suppressed can be produced.

DETAILED DESCRIPTION

The embodiments of the present disclosure will now be described with reference to the drawings. However, the embodiments described below are merely illustrative, and the present disclosure is not limited to the embodiments described below. The dimensions, materials, shapes, relative positions, etc., of the constituent elements described below are merely illustrative and do not limit the scope of the present disclosure unless otherwise noted. Moreover, the size, shape, positional relationship, etc., of the constituent elements illustrated in the drawings may be exaggerated to simplify the description.

[Method for Producing Electronic Component]

A method for producing an electronic component according to one embodiment of the present disclosure will now be described. The method of this embodiment includes a step of preparing a porous base body containing a ceramic and a step of impregnating the base body with a resin emulsion. An inner conductor is disposed in the base body.

First, a base body that constitutes the electronic component is prepared. The base body is a porous base body containing a ceramic. The base body may be a ceramic porous base body, and is, for example, a ceramic sinter. The base body has a plurality of pores.

The type of the ceramic constituting the base body can be appropriately selected depending on the usage of the electronic component, and may be, for example, a ferrite or a barium titanate ceramic. When the ceramic contains a ferrite, the ceramic may be any oxide containing a ferrite, and may be a complex oxide between a ferrite and another ceramic (for example, glass, steatite, alumina, zirconia, forsterite, quartz, etc.). When the ceramic contains a barium titanate ceramic, the barium titanate ceramic may be barium titanate or a barium titanate ceramic, some of Ba or Ti atoms of which are substituted with another element.

Figure 2:
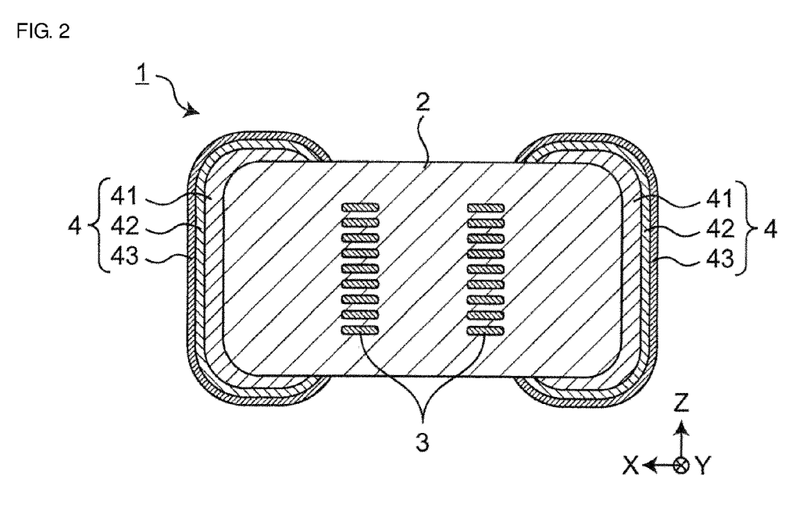
FIG. 2 is an XZ cross-sectional view of the electronic component illustrated in FIG. 1.

An inner conductor is disposed inside the base body. The shape of the inner conductor can be appropriately selected depending on the usage of the electronic component, and, for example, the inner conductor may be a coil or a layer-shaped inner electrode. The electronic component is equipped with one or more inner conductors. The electronic component may be equipped with two or more inner conductors. Specifically, when the electronic component is an inductor, as illustrated in FIG. 2, a coil-shaped inner conductor 3 is disposed in a base body 2. When the electronic component is a thermistor, the inner conductor may be at least one pair of inner electrodes, and the at least one pair of electrodes are disposed inside the base body so as to face each other.

The material constituting the inner conductor is not particularly limited, and may be at least one metal selected from the group consisting of Ni, Cu, Ag, Al, Pt, Pd, and Au or an alloy thereof.

The base body can be formed by, for example, applying or performing printing with a paste, which contains materials constituting the inner conductor, to or on a sheet that contains a ceramic that constitutes the base body, stacking the sheets, and baking the stacked sheets. Alternatively, the base body can be formed by applying or performing printing with a paste, which contains materials constituting the inner conductor, to or on a film formed by applying or performing printing with a paste that contains a ceramic that constitutes the base body, stacking the resulting products, and baking the stacked products.

Next, the base body is impregnated with a resin emulsion so as to fill the pores in the base body with a resin. An existing resin filling method has involved impregnating an electronic component with a homogeneous liquid, such as a solution prepared by diluting a resin and a prepolymer such as a monomer and an oligomer with a solvent, or a homogenous liquid of a prepolymer and a resin that are liquid at room temperature, etc. When resin impregnation is performed by using a homogenous liquid, not only the pores that exist near the surfaces of the base body, but also the pores that exist in the inner portion the base body, for example, a vicinity of the inner conductor, are filled with the resin. Since the electrical characteristics of the base body near the inner conductor significantly affect electrical characteristics of the electronic component, the more the pores that exist in the inner portion of the base body are filled with the resin, the more the electrical characteristics of the electronic component tend to be degraded. Furthermore, it is assumed that the more the pores that exist in the inner portion of the base body are filled with the resin, the more likely the stress generated by curing and shrinkage of the resin acts on the part of the base body near to the inner conductor. Presumably, the electrical characteristics of the electronic component would be degraded by the influence of this stress also. In contrast, in the method of this embodiment, resin impregnation is conducted by using an heterogeneous liquid, that is, a resin emulsion, instead of a homogeneous liquid. In this manner, the outer peripheral portion of the base body can be filled with the resin while suppressing penetration of the resin into the inner portion of the base body, for example, a vicinity of the inner conductor.

Although no theory limits the mechanism with which penetration of a resin into the inner portion of the base body is suppressed in performing resin impregnation using a resin emulsion, the mechanism is presumed to be as follows. A resin emulsion is formed of a dispersion medium, which is water, and a dispersoid, which is a liquid resin, dispersed in water and assuming the form of fine particles, and the resin that exists in the resin emulsion is in a fine particle state. Although pores may be connected from the base body surface to a vicinity of the inner conductor, the resin having the form of fine particles is likely to physically clog the portions where the pores connect to one another. Thus, when the base body is impregnated with a resin emulsion, the resin tends to clog in the outer peripheral portion of the base body, and thus rarely penetrates into the inner portion of the base body. As a result, a structure can be realized, in which, of the pores that exist in the base body, those pores that exist in the outer peripheral portion are filled with the resin while suppressing filling of those pores that exist in the inner portion of the base body, for example, the pores near the inner conductor or the pores in the gaps between the inner conductors, with the resin. Since the pores that exist in the outer peripheral portion are filled with the resin, the plating solution, moisture and gas in the ambient environment, etc., can be inhibited from passing through the outer peripheral portion of the base body and contacting the inner conductor, and degradation of electrical characteristics of the electronic component can be suppressed. Meanwhile, the amount of the resin that exists in the inner portion of the base body is smaller than the amount of the resin that exists in the outer peripheral portion of the base body; thus, possible adverse effects on the electrical characteristics of the inner portion of the base body, which significantly affect the electrical characteristics of the electronic component, can be reduced. As a result, the amount of the resin filling the part of the base body near the inner conductor can be reduced, and degradation of electrical characteristics of the electronic component can be suppressed. Furthermore, it is presumed that the stress generated in the inner portion of the base body, for example, in the vicinity of the inner conductor, by curing and shrinkage of the resin can be reduced. Presumably, degradation of the electrical characteristics of the electronic component can be suppressed due to this reduction in stress also.

Figure 1:
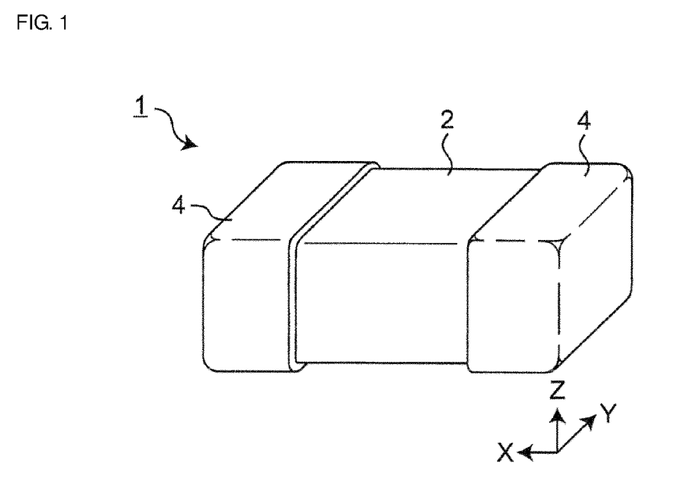
FIG. 1 is a perspective view of an electronic component according to one embodiment of the present disclosure.
Figure 3:
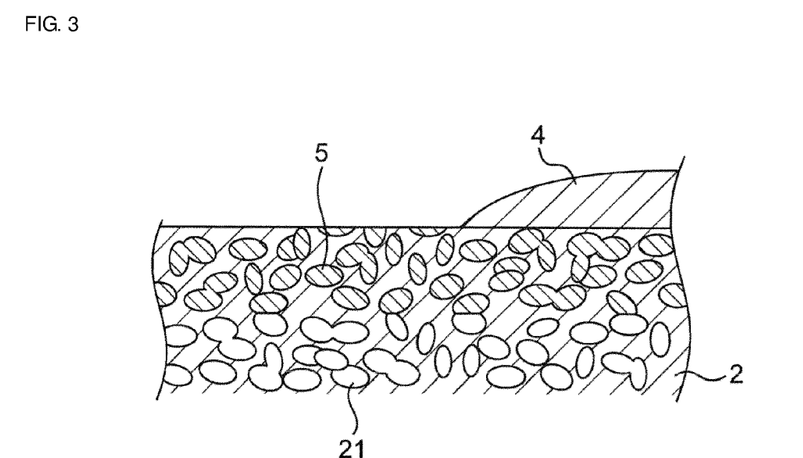
FIG. 3 is a partial enlarged view of the XZ cross-sectional view of the electronic component illustrated in FIG. 1.
Figure 4:
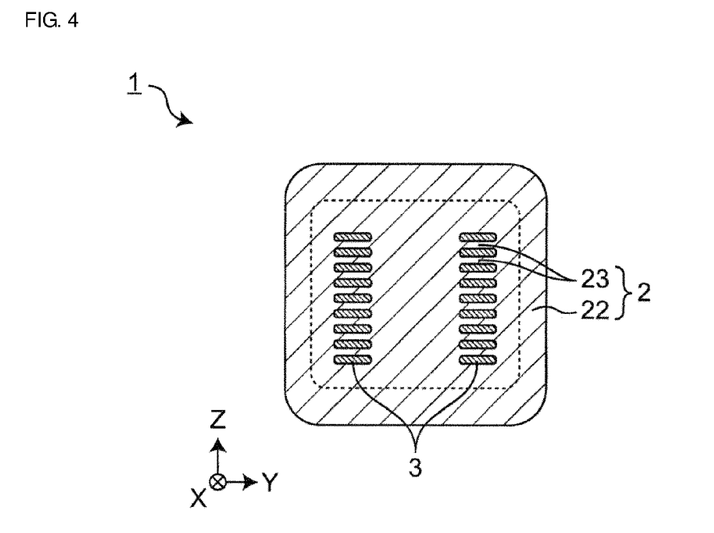
FIG. 4 is a YZ cross-sectional view of the electronic component illustrated in FIG. 1.

The base body filled with the resin by the method of this embodiment will now be described with reference to FIGS. 1 to 4. FIG. 1 is a perspective view illustrating one example of an electronic component produced by the method of this embodiment, FIG. 2 is an XZ cross-sectional view of the electronic component illustrated in FIG. 1, FIG. 3 is a partially enlarged view of an XZ cross-sectional view of the electronic component illustrated in FIG. 1, and FIG. 4 is a YZ cross-sectional view of the electronic component illustrated in FIG. 1. As illustrated in FIG. 3, pores 21 that exist in the outer peripheral portion of the base body 2 can be filled with a resin 5 by the method of this embodiment. The resin 5 filling the pores 21 is a cured product of the resin emulsion impregnating the base body 2. In this manner, the outer peripheral portion of the base body 2 is sealed with the resin 5, and it becomes possible to suppress penetration of the plating solution, and moisture and gas in the ambient environment into the inner portion of the base body 2. In other words, the resin 5 functions as a sealing material. Note that, as illustrated in FIG. 3, it is preferable to fill substantially all of the pores 21 that exist in the outer peripheral portion of the base body 2 with the resin 5, but there is no need to fill all the pores 21 in the outer peripheral portion. It suffices if pores are filled with the resin to an extent that can suppress penetration of the plating solution and moisture and suppress degradation of the electrical characteristics of the electronic component.

Meanwhile, the amount of the resin 5 filling the pores 21 that exist in the inner portion of the base body 2 is small compared to the amount of the resin 5 filling the pores 21 that exist in the outer peripheral portion. As illustrated in FIG. 3, the pores 21 that exist in the inner portion of the base body 2 are preferably not filled with the resin; however, the resin may exist inside the pores 21 that exist in the inner portion of the base body as long as the amount of the resin that exists in the inner portion of the base body 2 is smaller than the amount of the resin that exists in the outer peripheral portion.

In this description, the "outer peripheral portion" of the base body means a region near the surfaces of the base body 2, as indicated by reference sign 22 in FIG. 4. The region "near the surfaces" of the base body may be a region that extends 1 to 5 μm from the surfaces of the base body. The "inner portion" of the base body means a region that lies on the inner side with respect to the outer peripheral portion 22 of the base body, and may be, for example, a center portion of the base body.

The resin emulsion used in this embodiment is an aqueous emulsion in which a liquid resin serving as a dispersoid and assuming the form of fine particles is dispersed in water serving as a dispersion medium. The resin emulsion may be at least one emulsion selected from the group consisting of an epoxy emulsion, an acrylic emulsion, a silicone emulsion, and an acrylic-silicone emulsion. One emulsion may be used alone or a combination of two or more emulsions may be used as the resin emulsion.

The emulsion is preferably a silicone emulsion. Since a resin obtained by curing a silicone emulsion has high heat resistance, the reliability of the electronic component can be improved. The silicone emulsion may be any of an oil-based resin emulsion, a resin-based resin emulsion, and a rubber-based resin emulsion. In the emulsion of the present disclosure, for example, KM-9717, X-52-8005, X-51-1302M, Polon MF-28, Polon MF-56, Polon MF-40, X-52-8148, KM-2002L-1, KM-2002T, X-51-1318, and KM-9749 produced by Shin-Etsu Chemical Co., Ltd., TSW-831, YMR-7212, XS53-C2459, XS65-05410, XS65-C6594, and XS65-C6593 produced by Momentive Performance Materials Japan LLC, 40-418EF, CE-6400, CF-6140, SCF-55, and SA-6360 produced by DIC Corporation, and EM-0434AN, EM-0427WC, EM-0425C, and EH-8051 produced by ADEKA CORPORATION, etc., can be used.

The method for curing the resin contained in the emulsion is preferably a dehydration-condensation-type method. In the dehydration-condensation-type method (for example, when the resin has an alkoxy group, a silanol group, or a hydroxyl group as a reactive group), hydroxyl groups (silanol groups, Si—OH) are generated in the course of the curing reaction. Since the ceramic contained in the base body is an oxide, the adhesion between the resin and the ceramic is strengthened due to the interaction between the hydroxyl groups and the oxide, and the sealing property can be expected to improve. In addition, due to the interaction between the epoxy resin, which is commonly used as a flow adhesive in flow mounting, and the hydroxyl groups, the adhesion of the flow adhesive to the resin-filled base body can be expected to improve. Thus, when an electronic component sealed with a dehydration-condensation-type silicone emulsion is subjected to flow mounting, the issue of detachment of the electronic component from the adhesive can be suppressed.

The functional group introduced to the side chain of the resin component in the emulsion preferably has an aromatic ring (in particular, a phenyl group). The epoxy resin used in a flow adhesive frequently has a benzene ring in the structural formula. Due to the π-π interaction (stacking action) between the benzene ring in the flow adhesive and the aromatic ring in the resin filling the base body, the adhesion of the flow adhesive to the base body can be expected to improve. Thus, when an electronic component sealed with an emulsion of a resin having an aromatic ring in the side chain is subjected to flow mounting, the issue of detachment of the electronic component from the adhesive can be suppressed.

The particle diameter of the resin that exists in the emulsion and assumes the form of microdroplets is preferably about the same as or smaller than the opening diameter of the pores in the base body, and is preferably on submicron order. The magnitude of the resin particle diameter can determine the impregnation depth of the resin into the base body. When the resin particle diameter is about the same or smaller than the opening diameter, the outer peripheral portion of the base body can be impregnated with the resin while impregnation of the inner portion of the base body with the resin can be suppressed. The resin in the emulsion preferably has a particle diameter in the range of 0.01 μm or more and 1 μm or less (i.e., from 0.01 μm to 1 μm). When the resin particle diameter is 1 μm or less, the size of the resin is about the same or smaller than the opening diameter of the pores in the base body, and thus, the resin smoothly penetrates into the pores. When the resin particle diameter is 0.01 μm or more, the resin readily clogs the pores, and the pores that exist in the outer peripheral portion of the base body can be effectively filled with the resin. The resin in the emulsion more preferably has a particle diameter in the range of 0.01 μm or more and 0.5 μm or less (i.e., from 0.01 μm to 0.5 μm). When the resin particle diameter is 0.5 μm or less, the resin can more smoothly penetrate into the pores. In this description, the particle diameter of the resin is a value of D90 (particle diameter corresponding to 90% accumulated particle diameter distribution) on a volume basis measured by a dynamic light scattering technique using an emulsion having a resin solid content of 1.2 wt %.

The resin in the emulsion may have a particle size distribution having multiple peaks. When the resin particle size distribution has multiple peaks, relatively large resin particles clog the interiors of the pores so as to suppress penetration of the resin into the inner portion of the base body, i.e., the region between the inner conductors, and, meanwhile, relatively small resin particles fill the gaps in the outer peripheral portion left unfilled with the relatively large resin particles. Thus, the sealing property of the base body can be further enhanced. In this description, the particle size distribution of the resin is measured by a dynamic light scattering technique using an emulsion having a resin solid content of 1.2 wt %. The peaks may be found in the range of 0.01 μm or more and less than 0.1 μm (i.e., from 0.01 μm to 0.1 μm) and in the range of 0.1 μm or more and 0.5 μm or less (i.e., from 0.1 μm to 0.5 μm). The pore distribution of the porous base body (ferrite porous body) is frequently distributed from 0.1 to 0.5 μm, and the peaks are frequently found near 0.2 μm. Thus, large pores can be filled with emulsion particles 0.1 μm or more and 0.5 μm or less (i.e., from 0.1 μm to 0.5 μm) in size, and the remaining gaps can be filled with emulsion particles 0.01 μm or more and less than 0.1 μm (i.e., from 0.01 μm to 0.1 μm) in size.

The resin emulsion may contain, in addition to the resin and water serving as a dispersion medium as described above, a surfactant for dispersing the resin in water. The surfactant may be nonionic, anionic, or cationic.

The method for producing the resin emulsion is not particularly limited, and, for example, an O/W emulsion containing a resin dispersed in water can be prepared by mixing water, the resin, and a surfactant and stirring the resulting mixture.

Impregnation of the base body with the resin emulsion can be performed by immersing the entire base body in a resin emulsion and holding this state for a particular length of time. Immersion may be performed at a reduced pressure, for example, while evacuating. Alternatively, immersion may be performed under pressure. Alternatively, the base body may be first evacuated and then impregnated with the resin emulsion. After the base body is impregnated with the resin emulsion, excess emulsion attaching to the surfaces of the base body may be removed by washing. When a homogeneous resin is used for sealing as in the related art, in order to wash away the excess resin, prepolymer solution, or liquid resin attaching to the surfaces of the base body, an organic solvent that can dissolve these must be used. In contrast, in this embodiment, since an emulsion containing a prepolymer etc., dispersed in an aqueous medium is used, washing can be conducted by using water (or an aqueous solution). Thus, there is an advantage regarding the production facility in that the explosion-proof treatment is no longer necessary and also an advantage regarding the waste liquid treatment. Next, the base body is heat-treated to cure the resin to fix the resin within the pores. The curing conditions, such as the curing temperature, can be appropriately set depending on the type of the resin to be used. In the method of this embodiment, presumably since the amount of the resin that exists in the inner portion of the base body is small, the impact of the stress generated by curing and shrinkage of the resin on the part of the base body near the inner conductor can be reduced. Presumably thus, degradation of the electrical characteristics of the electronic component caused by the stress can be suppressed.

The base body impregnated with the resin emulsion may subsequently be impregnated with a homogeneous resin. In this manner, while the resin in the emulsion clogging the outer peripheral portion of the base body suppresses penetration of the resin into the inner portion of the base body, the sealing property of the outer peripheral portion of the base body can be further enhanced. Impregnation of the base body with a homogeneous resin can be performed by the same method as the impregnation with the emulsion. The impregnation of the base body with the homogeneous resin may be performed by a method involving impregnating the base body with the emulsion, curing the resin in the emulsion, and then impregnating the base body, the outer peripheral portion of which has been sealed with the cured product of the resin in the emulsion, with a homogeneous resin.

The method according to this embodiment may further include a step of forming an outer electrode on a surface of the base body so that the outer electrode is electrically connected to the inner conductor. The outer electrode may be formed of a single layer or a plurality of layers, as illustrated in FIG. 2. Note that in the example illustrated in FIG. 2, the outer electrode 4 is constituted by three layers (a first layer 41, a second layer 42, and a third layer 43); however, the outer electrode may be constituted by two layers or four or more layers. The outer electrode may be composed of a conductor containing a conductive material, such as gold, silver, palladium, copper, nickel, or tin. The outer electrode may contain only one conductive material or two or more conductive materials (for example, an alloy). When the outer electrode is constituted by two or more layers, the types of the conductive materials contained in the respective layers may be the same or different.

The outer electrode can be formed by plating. When the outer electrode is constituted by two or more layers, at least one of the layers of the outer electrode can be formed by plating. When the outer electrode is formed by plating and the base body is impregnated and filled with the resin, the resin serves as a sealing material; thus, penetration of the plating solution into the inner portion of the base body can be suppressed, and degradation of the electrical characteristics of the electronic component can be suppressed. Note that when the outer electrode is constituted by two or more layers, it is not necessary to form all of the layers by plating. For example, when the outer electrode 4 is constituted by three layers 41 to 43 as illustrated in FIG. 2, the first layer 41 may be formed by a method other than plating (for example, metal paste baking or sputtering), and the second layer 42 (for example, a Ni plating layer) and the third layer 43 (for example, a Sn plating layer) may be formed on the first layer 41 by plating. In other words, the first layer 41 may be formed before or after impregnating or filling the base body with the resin.

[Electronic Component]

Next, an electronic component according to one embodiment of the present disclosure is described. An electronic component according to one embodiment of the present disclosure can be produced by the above-described method. The electronic component may be an inductor, a thermistor, a capacitor, or the like. An example of the electronic component of this embodiment is illustrated in FIGS. 1 to 4. The electronic component illustrated in FIGS. 1 to 4 is an inductor. An electronic component 1 of this embodiment includes a porous base body 2 containing a ceramic; and an inner conductor 3 disposed inside the base body 2, and the base body 2 is filled with a resin 5. Specifically, the resin 5 fills the outer peripheral portion of the porous base body 2. The base body 2 may be a porous base body composed of a ceramic. The composition of the ceramic constituting the base body 2 is as described above. The resin 5 filling the base body 2 is a cured product of the resin emulsion described above. The amount of the resin 5 in the inner portion of the base body 2 is small compared to the amount of the resin 5 in the outer peripheral portion of the base body 2. Since the outer peripheral portion of the base body 2 is sealed with the resin 5, penetration of the plating solution and moisture into the inner portion of the base body can be suppressed, and degradation of the electrical characteristics of the electronic component can be suppressed. Furthermore, presumably due to this structure, it is possible to suppress the stress, caused by curing and shrinkage of the resin, acting on the portion of the base body near the inner conductor 3, and presumably as a result, degradation of the electrical characteristics of the electronic component 1 is suppressed. In this description, the amount of the resin in the outer peripheral portion relative to the amount of the resin in the inner portion of the base body is determined by performing wavelength dispersive X-ray spectroscopy (WDX) on a section of the base body.

The electronic component 1 may further include outer electrodes 4. The outer electrodes 4 may each be formed of a single layer or two or more layers. Note that in the example illustrated in FIG. 2, the outer electrode 4 is constituted by three layers; however, the outer electrode may be constituted by two layers or four or more layers. The outer electrode 4 can be formed by plating. When the outer electrode 4 is constituted by two or more layers, at least one of the layers can be formed by plating. The composition of the outer electrode is as described above.

Examples

Electronic components of Examples 1 to 3 and Comparative Example 1 were prepared by the process described below. Inductors each formed of a ferrite base body and a coil, which served as an inner conductor, were prepared as the electronic components of Examples and Comparative Example.

First, a component equipped with a porous base body having multiple pores and an inner conductor disposed inside the base body was prepared. An inductor that includes a first layer of the outer electrode was prepared by applying a metal paste to the component and drying the applied metal paste. The inductor was impregnated with a treatment agent shown in Table 1 to seal the base body. A resin emulsion was used as the treatment agent in Examples 1 to 3, and a solventless liquid prepolymer was used as the treatment agent in Comparative Example 1. Impregnation with the treatment agent was performed by a vacuum impregnation technique involving immersing the inductor in the treatment agent, followed by evacuation. After the impregnation, excess treatment agent attached to the surfaces of the chip was removed by washing, and a heat treatment was conducted to cure the resin. Next, a barrel treatment was performed to further remove the residue on the surfaces. Subsequently, Ni plating and Sn plating were performed, and an electronic component (inductor) was obtained thereby. The electronic components of Examples 1 to 3 and Comparative Example 1 obtained as such were subjected to characteristics evaluation described below.

(Evaluation of Electrical Characteristics)

The impedance IZI of the electronic component at 100 MHz was measured with E4991A RF impedance analyzer produced by Agilent Technologies Japan, Ltd. For each of the examples, the impedance measurement was performed before and after the sealing treatment. The impedance measurement after the sealing treatment was performed after the plating treatment. The samples having an impedance dropped by 10% or more between before and after the sealing treatment were evaluated as being significantly affected by the stress from the resin and were evaluated as poor. The number of evaluation samples was n=20 for each example. The number of the electronic components evaluated as poor is indicated in Table 1.

(Evaluation of Sealing Property)

Sealing Property Against Plating Solution

When the sealing property against plating solution is low, the plating solution may penetrate into the inner portion of the base body and may cause short-circuiting of the inner conductor. The impedance was measured before and after the plating treatment, and electronic components having an impedance dropped after plating at 100 MHz to ¾ or less of the impedance of the electronic component before plating were assumed to have experienced short circuiting and were evaluated as poor. The number of evaluation samples was n=100 for each example. The number of the electronic components evaluated as poor is indicated in Table 1.

Sealing Property Against Flux

For the electronic components of each example, solder reflow (Sn—Ag—Cu) was performed, and whether non-cohesion occurred was checked. If the sealing property against the flux is low, the flux in the solder penetrates into the inner portion of the base body, and thus, the solder particles do not smoothly melt due to the insufficient flux, and non-cohesion may occur. The electronic component after the reflow was observed with a stereomicroscope, and samples in which particles were present in 25% or more of the length of the outer periphery of the solder were evaluated as having non-cohesion, and samples evaluated as having non-cohesion were evaluated as poor. The number of evaluation samples was n=100 for each example. The number of the electronic components evaluated as poor is indicated in Table 1.

Sealing Property Against Corrosive Gas

The electronic components of the respective examples were subjected to a gas corrosion test by leaving the electronic components in a corrosive gas atmosphere with a $H_2S$ concentration of 25 ppm, at a temperature of 40° C., and a humidity of 85% RH for 240 hours. If the sealing property against corrosive gas is low, the corrosive gas penetrates into the inner portion of the base body, and corrodes the inner conductor. As a result, the inner conductors may suffer disconnection. The Rdc (DC resistance) of each electronic component was measured, and samples with Rdc increased by 50% or more between before and after the gas corrosion test were determined as having disconnection and evaluated as poor. The number of evaluation samples was n=100 for each example. The number of the electronic components evaluated as poor is indicated in Table 1.

(Evaluation of Adhesion of the Flow Adhesive)

For the electronic components of the respective examples, the adhesive strength to an epoxy resin flow adhesive was measured. The adhesive strength was measured through a shear strength test in accordance with JIS 62137-1-2. Samples with a shear strength of 5 N or less were evaluated as poor. The number of evaluation samples was n=35 for each example. The number of the electronic components evaluated as poor is indicated in Table 1.

electronic components of Examples 1 to 3, the impedance did not decrease between before and after the sealing treatment, and good sealing properties were exhibited against the plating solution and the flux. Thus, the electronic components of Examples 1 to 3 could suppress degradation of the electrical characteristics, and, at the same time, could suppress penetration of the plating solution and the flux. This is presumably because the resin in the form of fine particles in the emulsion readily clogs the pores in the base body, and thus can stay in the outer peripheral portion of the base body and rarely reaches near the inner conductor.

In Examples 2 and 3 in which a dehydration-condensation-type silicone emulsion was used, penetration of not only the plating solution and the flux but also the corrosive gas could be suppressed, and good sealing properties were exhibited against the corrosive gas also. This is presumably because the interaction between the oxide in the base body and the hydroxyl groups generated in the course of the curing reaction of the resin strengthened the adhesion between the resin and the ceramic.

It was also found that the electronic components of Examples 2 and 3 in which the dehydration-condensation-type silicone emulsion was used had high adhesion to the flow adhesive. Furthermore, the electronic component of Example 3 in which an emulsion of a resin having an aromatic ring in the side chain was used exhibited higher adhesion to the flow adhesive.

Next, electronic components of Examples 4 to 6 were prepared by the same method as in Examples 1 to 3. The base body sealing treatment was performed by using the treatment agent shown in Table 2. All of the treatment agents used in Examples 4 to 6 were aqueous emulsions. The obtained electronic components were subjected to the characteristics evaluation as with Examples 1 to 3. The results are shown in Table 2.

TABLE 1

| | | Comparative Example 1 | Example 1 | Example 2 | Example 3 |
|---|---|---|---|---|---|
| Treatment agent | Form | Liquid prepolymer | Emulsion | Emulsion | Emulsion |
| | Resin | Silicone | Silicone | Silicone | Silicone |
| | Reaction type | Addition polymerization | Addition polymerization | Dehydration condensation | Dehydration condensation |
| | Side chain functional group | Methyl | Methyl | Methyl | Methyl phenyl |
| Evaluation | Electrical characteristics | 20/20 | 0/20 | 0/20 | 0/20 |
| | Sealing property  Plating solution | 0/100 | 0/100 | 0/100 | 0/100 |
| | Flux | 0/100 | 0/100 | 0/100 | 0/100 |
| | Corrosive gas | 0/100 | 20/100 | 0/100 | 0/100 |
| | Adhesive strength to flow adhesive | 35/35 | 35/35 | 10/35 | 0/35 |

In Comparative Example 1, in which a solventless silicone was used, degradation of the electrical characteristics was observed. This is presumably because the homogeneous solventless silicone was used for sealing and the resin passed through the pores in the base body and penetrated into the portion near the inner conductor. In contrast, in Examples 1 to 3 in which an aqueous emulsion was used, degradation of electrical characteristics was not observed.

The electronic component of Comparative Example 1 exhibited good sealing properties against the plating solution, the flux, and the corrosive gas. This is presumably because the homogeneous solventless silicone was used for sealing, the resin passed through the pores in the base body and penetrated into the portion near the inner conductor, and not only the pores that existed in the outer peripheral portion of the base body but also the pores that existed near the inner conductor were filled with the resin. Meanwhile, in all of the

TABLE 2

| | | Example 4 | Example 5 | Example 6 |
|---|---|---|---|---|
| Treatment agent | Form | Emulsion | Emulsion | Emulsion |
| | Resin | Acrylic | Acrylic silicone | Epoxy |
| Evaluation | Electrical characteristics | 0/20 | 0/20 | 0/20 |
| | Sealing property  Plating solution | 0/100 | 0/100 | 0/100 |
| | Flux | 0/100 | 0/100 | 0/100 |
| | Corrosive gas | 0/100 | 0/100 | 0/100 |
| | Adhesive strength to flow adhesive | 10/35 | 30/35 | 0/35 |

Degradation of electrical characteristics was not observed in any of Examples 4 to 6 in which an aqueous emulsion was used. The electronic components of Examples 4 to 6 exhibited good sealing properties against the plating solution, the flux, and the corrosive gas.

It was also found that the electronic component of Example 6 in which an epoxy resin emulsion was used had high adhesion to the flow adhesive.

Figure 5A:
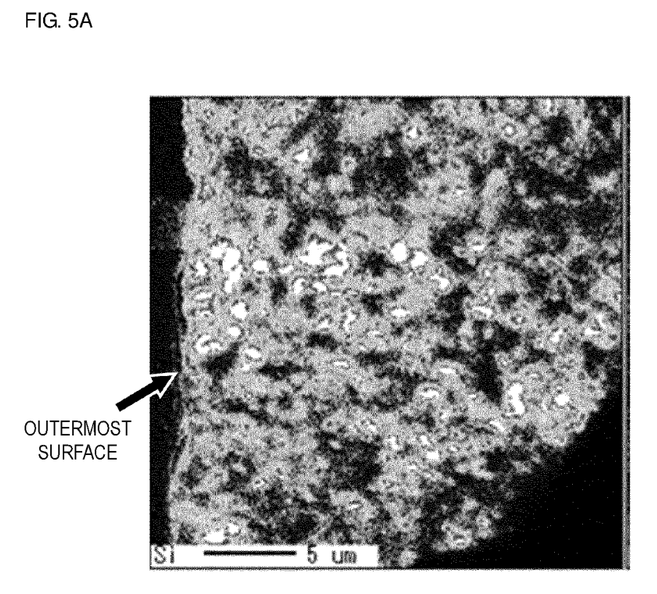
FIG. 5A is an FE-WDX Si mapping image of a section of an electronic component of Comparative Example 1.
Figure 5B:
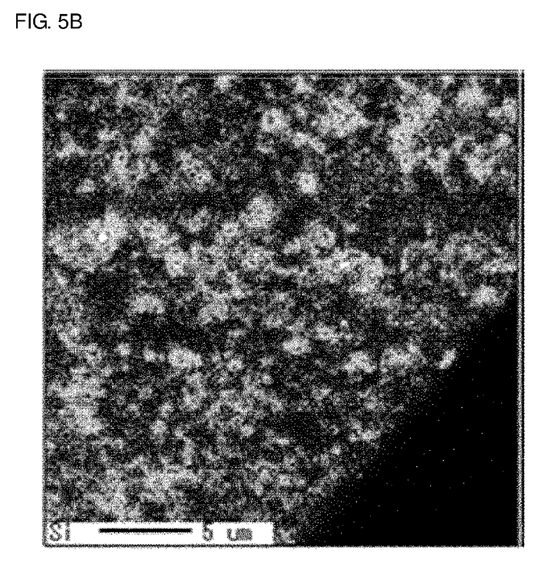
FIG. 5B is an FE-WDX Si mapping image of a section of the electronic component of Comparative Example 1.
Figure 6A:
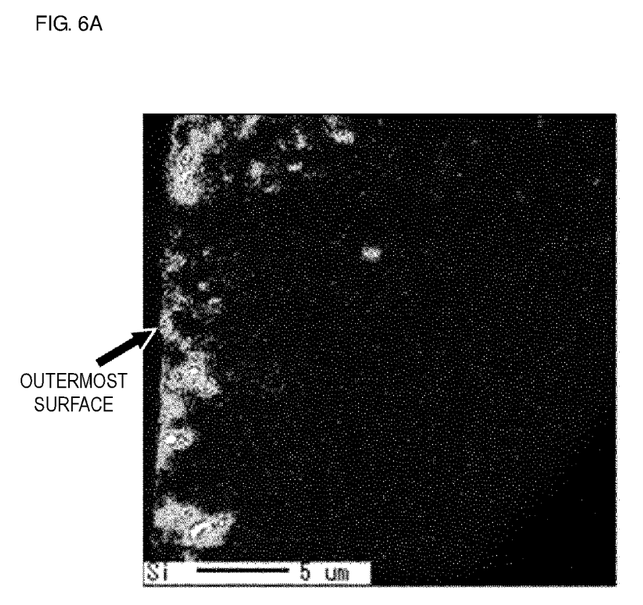
FIG. 6A is an FE-WDX Si mapping image of a section of an electronic component of Example 3.
Figure 6B:
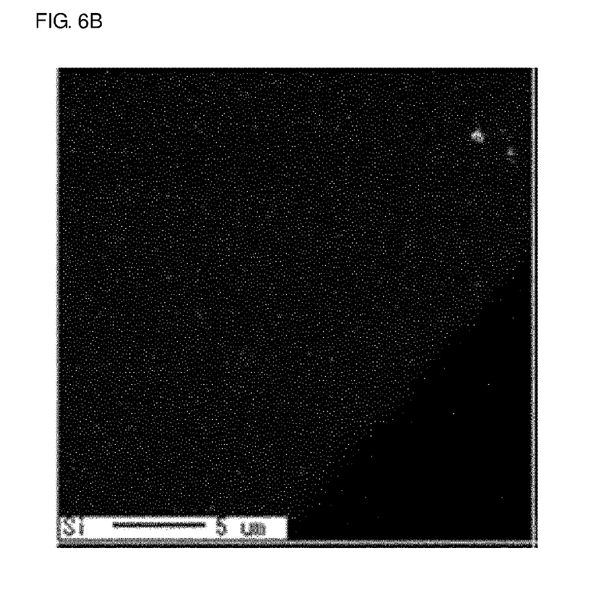
FIG. 6B is an FE-WDX Si mapping image of a section of the electronic component of Example 3.
Figure 7:
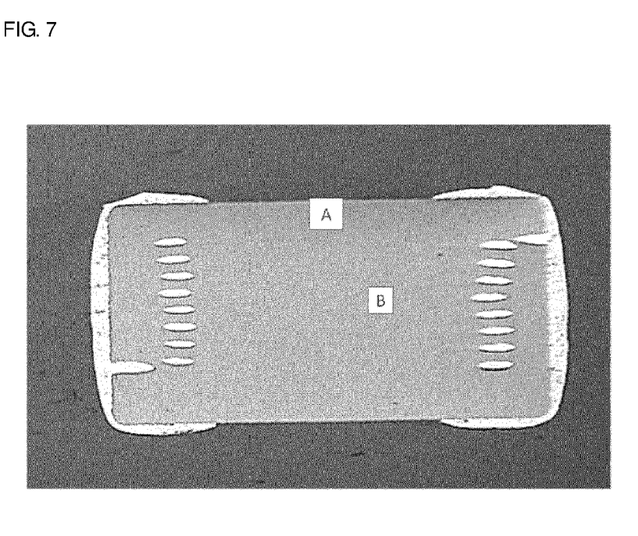
FIG. 7 is a diagram indicating the positions where the FE-WDX Si mapping images in FIGS. 5A, 5B, 6A, and 6B are photographed.

Sections of the electronic components of Comparative Example 1 and Example 3 were subjected to an FE-WDX Si mapping analysis. FE-WDX was performed at an acceleration voltage of 15 kV and irradiation current of $5 \times 10^{-8}$ A. The results are shown in FIGS. 5A, 5B, 6A, and 6C. FIG. 5A is an FE-WDX Si mapping image of the outer peripheral portion (marked as A in FIG. 7) of the electronic component of Comparative Example 1. FIG. 5B is an FE-WDX Si mapping image of the inner portion (marked as B in FIG. 7) of the electronic component of Comparative Example 1. FIG. 6A is an FE-WDX Si mapping image of a section of the outer peripheral portion (marked as A in FIG. 7) of the electronic component of Example 3. FIG. 6B is an FE-WDX Si mapping image of a section of the inner portion (marked as B in FIG. 7) of the electronic component of Example 3. The light-shaded portions in FIGS. 5 and 6 indicate the presence of the resin, and dark-shaded portions indicate the absence of the resin. As apparent from FIGS. 5 and 6, even the inner portion of the base body is filled with the resin in Comparative Example 1, whereas much of the resin was present in the outer peripheral portion of the base body and almost no resin was found in the inner portion of the base body in Example 3.

In order to determine the amount of the resin in the inner portion of the base body relative to the amount of the resin in the outer peripheral portion of the base body, wavelength dispersive X-ray spectroscopy (WDX) was performed on a section of the electronic component of Example 4, and the relative amount of the resin was determined on a basis of the carbon (C) content. The analysis was performed on three points at a depth of about 5 μm from the surface for the outer peripheral portion, and was performed on a point in the center portion of the base body for the inner portion. The results are shown in Table 3.

TABLE 3

| Measurement point | C (atom %) |
|---|---|
| Outer peripheral portion 1 | 3.3 |
| Outer peripheral portion 2 | 3.4 |
| Outer peripheral portion 3 | 2.5 |
| Average in outer peripheral portion | 3.1 |
| Inner portion | 1.2 |

As apparent from Table 3, the amount of the resin in the inner portion of the base body relative to the amount of the resin in the outer peripheral portion of the base body was ½ or less. This shows that, when an emulsion is used, the amount of the resin in the inner portion of the base body can be adjusted to ½ or less of the amount of the resin in the outer peripheral portion of the base body, and, in this case, a high sealing property can be obtained while suppressing degradation of the electrical characteristics.

The method for producing an electronic component according to the present disclosure can be used to produce a highly reliable electronic component, and is applicable to production of various electronic components, such as inductors, thermistors, etc.

What is claimed is:

1. A method for producing an electronic component, the method comprising:
   preparing a porous base body containing a ceramic and including an inner conductor disposed inside the base body; and
   impregnating the base body with an emulsion of a resin, wherein
   the resin in the emulsion has a particle size distribution having a plurality of peaks.

2. The method according to claim 1, further comprising:
   forming an outer electrode on a surface of the base body so that the outer electrode is electrically connected to the inner conductor, wherein
   at least one layer in the outer electrode is formed by plating.

3. The method according to claim 1, further comprising:
   impregnating the emulsion-impregnated base body with a homogeneous resin.

4. The method according to claim 1, further comprising:
   washing, with water, the emulsion-impregnated base body.

5. The method according to claim 1, wherein
   the resin in the emulsion has a particle diameter in a range from 0.01 μm to 1 μm.

6. The method according to claim 5, wherein
   the resin in the emulsion has a particle diameter in a range from 0.01 μm to 0.5 μm.

7. The method according to claim 1, wherein
   the emulsion is at least one emulsion selected from the group consisting of an epoxy emulsion, an acrylic emulsion, a silicone emulsion, and an acrylic-silicone emulsion.

8. The method according to claim 7, wherein
   the emulsion is a silicone emulsion.

9. The method according to claim 7, wherein
   the resin in the emulsion has a particle diameter in a range from 0.01 μm to 1 μm.

10. The method according to claim 7, further comprising:
    forming an outer electrode on a surface of the base body so that the outer electrode is electrically connected to the inner conductor, wherein
    at least one layer in the outer electrode is formed by plating.

11. The method according to claim 7, further comprising:
    impregnating the emulsion-impregnated base body with a homogeneous resin.

12. The method according to claim 7, further comprising:
    washing, with water, the emulsion-impregnated base body.

* * * * *